(12) United States Patent
Liffick

(10) Patent No.: US 6,421,439 B1
(45) Date of Patent: Jul. 16, 2002

(54) SYSTEM AND METHOD FOR USER AFFILIATION IN A TELEPHONE NETWORK

(75) Inventor: Stephen Mitchell Liffick, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/275,689

(22) Filed: Mar. 24, 1999

(51) Int. Cl.⁷ .............................. H04M 3/42; G06F 9/46
(52) U.S. Cl. .............................. 379/211.02; 379/201.02; 709/328
(58) Field of Search .................. 379/201.01, 201.02, 379/201.03, 188, 196, 197, 198, 199, 200, 210.02, 210.03, 211.01, 211.02, 900; 370/352; 709/311, 312, 320, 328

(56) References Cited

U.S. PATENT DOCUMENTS 5,329,578 A * 7/1994 Brennan et al. ....... 379/211.03
6,005,870 A * 12/1999 Leung et al. ............... 370/466
6,041,108 A * 3/2000 Brewster et al. ............ 379/196

* cited by examiner

Primary Examiner—Ahmad F. Matar
Assistant Examiner—Benny Q. Tieu
(74) Attorney, Agent, or Firm—Workman, Nydegger, Seeley

(57) ABSTRACT

A telecommunication system combines telephone technology and Internet technology to establish one or more user-specified affiliation lists. The affiliation lists are stored on the Internet and are accessible by the user and by the telecommunication portion of the system. The affiliation lists are used to process incoming calls to the user's destination telephone number. A central office switch receives the call being directed to the destination telephone number and uses a communication link with the Internet to access the user's affiliation lists. The incoming call is processed in accordance with the user-specified rules in the affiliation lists. The user may accept all incoming calls, no incoming calls, or incoming calls only from specified parties. The call processing rules may be readily edited by the user and can also include alternative call processing rules that vary in accordance with the time of day or with the user's personal desires.

51 Claims, 8 Drawing Sheets

| | |
|---|---|
| Name | Bob Smith |
| Subscriber Name | bobxyz@msn.com |
| Phone 1 | (425) 555-1234 |
| Phone 2 | (425) 555-1235 |

⋮

| | |
|---|---|
| Name | Jim Smith |
| Subscriber Name | NONE |
| Phone 1 | (206) 555-1236 |

⋮

| | |
|---|---|
| Name | John Adams |
| Subscriber Name | johnxyz@aol.com |
| Email Alias | atom smasher xyz |
| Phone 1 | (703) 555-1237 |
| Phone 2 | (703) 555-1238 |
| Phone 3 | (703) 555-1239 |

| | |
|---|---|
| Name | Bob Smith |
| Subscriber Name | bobxyz@msn.com |
| Phone 1 | (425) 555-1234 |
| Phone 2 | (425) 555-1235 |
| Status | Allowed |

⋮

| | |
|---|---|
| Name | Jim Smith |
| Subscriber Name | NONE |
| Phone 1 | (206) 555-1236 |
| Status | Blocked |

⋮

| | |
|---|---|
| Name | John Adams |
| Subscriber Name | johnxyz@aol.com |
| Email Alias | atom smasher xyz |
| Phone 1 | (703) 555-1237 |
| Phone 2 | (703) 555-1238 |
| Phone 3 | (703) 555-1239 |
| Status | Conditional |
|     Phone 1 - | Allowed |
|     Phone 2 - | Allowed 9:00 a.m. - 11:30 a.m. |
|     Phone 3 - | Blocked |

*Fig. 7*

SYSTEM AND METHOD FOR USER AFFILIATION IN A TELEPHONE NETWORK

TECHNICAL FIELD

The present invention is directed generally to telecommunications and, more particularly, to a system and method for user selection of individual affiliations in a telephone network.

BACKGROUND OF THE INVENTION

Advances in telecommunication technology provide a user with a broad variety of communication options. For example, advances in telephone communication, including wireless telephone and cellular telephone, allow almost instantaneous communication between virtually any two locations on earth. Telephone service providers typically offer wide range of options, such as voice mail, caller identification, call waiting, call forwarding, three-way calling, and the like. The telephone service subscriber can customize their own telecommunications service with the selection of one or more options.

Despite these advances, the user is still limited in determining with whom the user wishes to speak and when the user wishes to speak with certain parties or, at the user's option, not speak with certain parties. Although caller identification (ID) can identify the calling party, caller ID does not always correctly identify the caller. For example, if the number identification data is not transmitted along with the call, the caller ID device indicates that caller data is "unavailable." In addition, the user must still respond to the ringing telephone and view the caller identification box to determine whether or not to answer the telephone. Thus, existing telephone technologies do not always provide user with the desired degree of control over incoming calls.

Therefore, it can be appreciated that there is a significant need for system and method to control incoming calls to a user's telephone. The present invention provides this and other advantages as will be apparent from the following detailed description and accompanying figures.

SUMMARY OF THE INVENTION

A system to specify user-selectable criteria for call processing is implemented on a conventional telephone system, such as a public switched telephone network (PSTN). The user-specified call processing criteria is stored on a network that is accessible by the user for data entry and/or editing, and is also accessible by the PSTN to determine whether call processing criteria exists for the particular caller. The Internet provides a readily available data structure for storage of the user-selectable call processing criteria. The user can establish a database stored on the Internet in association with the user's telephone number and indicating the user-selectable call processing criteria for one or more potential callers.

The caller may be identified by caller identification data, such as automatic number identification (ANI). Based on the destination telephone number and the caller identification data, the PSTN accesses the Internet and examines an affiliation list corresponding to the destination telephone number. If the caller identification data is present in the affiliation list, the call may be processed in accordance with the user-specified criteria for that particular caller.

The user (i.e., the called party) can specify user-selectable call processing criteria for all incoming calls, incoming calls from selected callers, and may further apply conditional criteria based on user preferences. For example, the user may select all calls during certain times of the day, calls from selected parties during other specified times of the day, and no calls during other times of the day. The user-selectable call processing criteria may be readily edited by the user and may be applied to multiple phone numbers associated with a particular caller.

The system may be readily implemented on current telephone systems with no significant modifications. For example, the system may apply the user-specified call processing criteria at the central office switch to which the destination telephone is coupled. All call processing prior to arrival at that central office switch is performed in accordance with conventional telecommunication techniques and standards. When a call arrives at the central office switch coupled to the destination telephone, the central office switch does not immediately establish a communication link with the destination telephone, but accesses the user-specified call processing criteria on the Internet and applies the call processing criteria. If the call is allowed, the central office switch establishes a communication link with the destination telephone in a conventional fashion to complete the telephone call. If the call is not allowed, the central office switch will not process the call, and may generate a busy signal to indicate that the user is unavailable.

The system may also be implemented at other points in the telecommunication network, such as a central office switch at the originating telephone. In addition, the user-specified call processing criteria may be stored on other forms of networks that are accessible to both the user (i.e., the called party) and the telecommunication system.

BRIEF DESCRIPTION OF THE DRAWINGS

FIG. 6 illustrates sample data provided in the list of FIG. 5.

FIG. 7 illustrates additional sample data provided in the list of FIG. 3.

DETAILED DESCRIPTION OF THE INVENTION

Existing telephone technology does not provide the telephone subscriber with a technique for controlling access to the user's telephone. Features such as caller ID identify the caller, but do not control access to the user's telephone. Thus, the conventional telephone system forwards the user to extreme options. The user may answer all incoming calls or may choose not to answer any incoming calls. However, the present invention provides selective options in between these two extremes. The present invention combines telephone technology with Internet technology to allow the user to "filter" incoming calls based on user-selected criteria. In particular, the user may establish a series of lists, stored on the Internet in association with the user's telephone, to filter incoming calls and thereby control access to the user's telephone.

Figure 1:
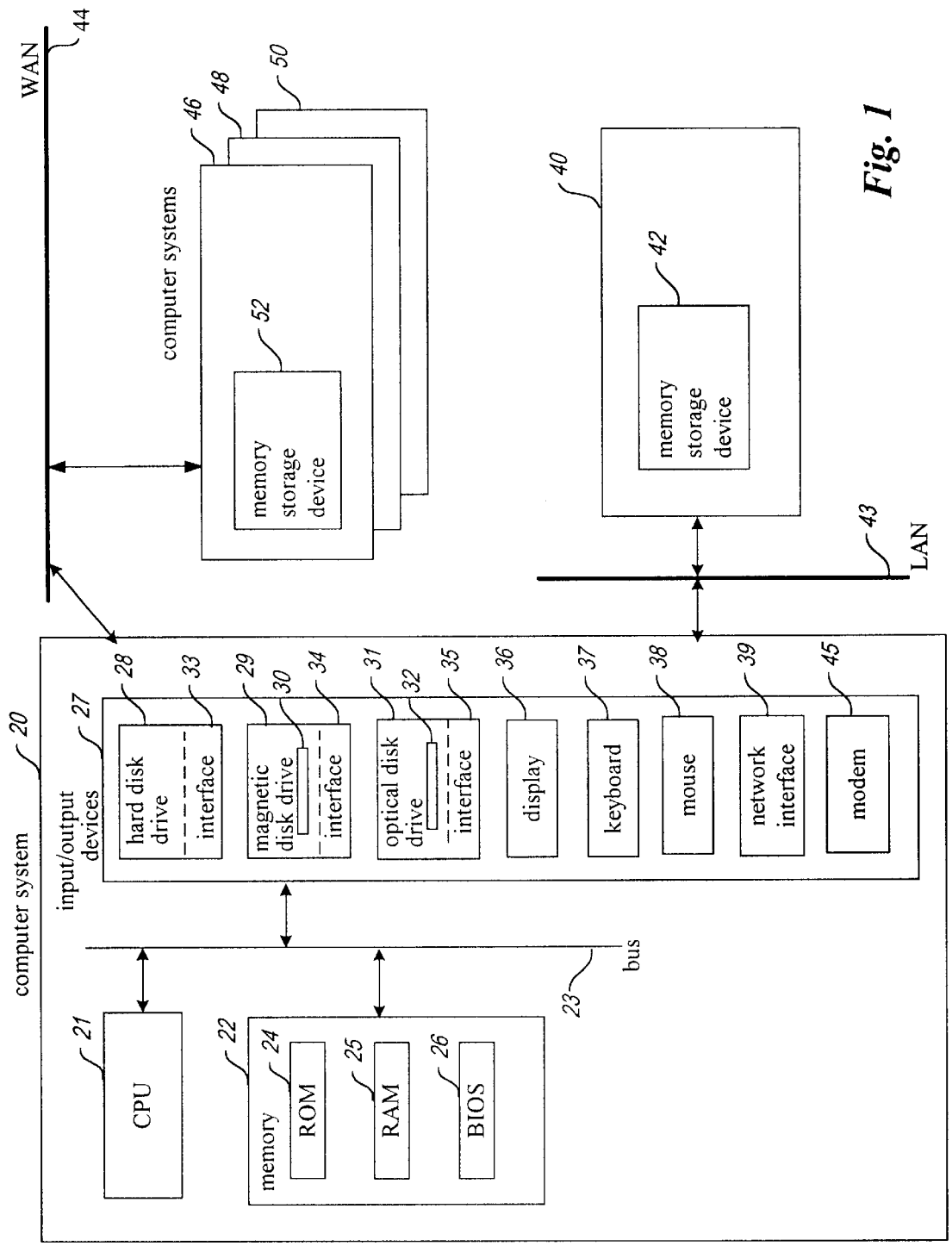
FIG. 1 illustrates a computer system that includes components to implement the system of the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output system 26 (BIOS), containing the basic routines that helps to transfer information between elements within the personal computer 20, such as during start-up, may be stored in ROM 24.

The personal computer 20 further includes input/output devices 27, such as a hard disk drive 28 for reading from and writing to a hard disk, not shown, a magnetic disk drive 29 for reading from or writing to a removable magnetic disk 30, and an optical disk drive 31 for reading from or writing to a removable optical disk 32 such as a CD ROM or other optical media. The hard disk drive 28, magnetic disk drive 29, and optical disk drive 31 are connected to the system bus 23 by a hard disk drive interface 33, a magnetic disk drive interface 34, and an optical drive interface 35, respectively. The drives and their associated computer-readable media provide nonvolatile storage of computer readable instructions, data structures, program modules and other data for the personal computer 20. Although the exemplary environment described herein employs a hard disk, a removable magnetic disk 30 and a removable optical disk 32, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment. Other I/O devices 27, such as a display 36, keyboard 37, mouse 38, and the like may be included in the personal computer 20 and function in a known manner. For the sake of brevity, other components, such as a joystick, sound board and speakers are not illustrated in FIG. 1.

The personal computer 20 may also include a network interface 36 to permit operation in a networked environment using logical connections to one or more remote computers, such as a remote computer 40. The remote computer 40 may be another personal computer, a server, a router, a network PC, a peer device or other common network node, and typically includes many or all of the elements described above relative to the personal computer 20, although only a memory storage device 42 has been illustrated in FIG. 1. The logical connections depicted in FIG. 1 include a local area network (LAN) 43 and a wide area network (WAN) 44. Such networking environments are commonplace in offices, enterprise-wide computer networks, intranets and the Internet.

When used in a LAN networking environment, the personal computer 20 is connected to the LAN 43 through the network interface 39. When used in a WAN networking environment, the personal computer 20 typically includes a modem 45 or other means for establishing communications over the wide area network 44, such as the Internet. The modem 45, which may be internal or external, permits communication with remote computers 46–50. In a networked environment, program modules depicted relative to the personal computer 20, or portions thereof, may be stored in the remote memory storage device 42 via the LAN 51 or stored in a remote memory storage device 52 via the WAN 44. It will be appreciated that the network connections shown are exemplary and other means of establishing a communications link between the computers may be used.

Figure 2:
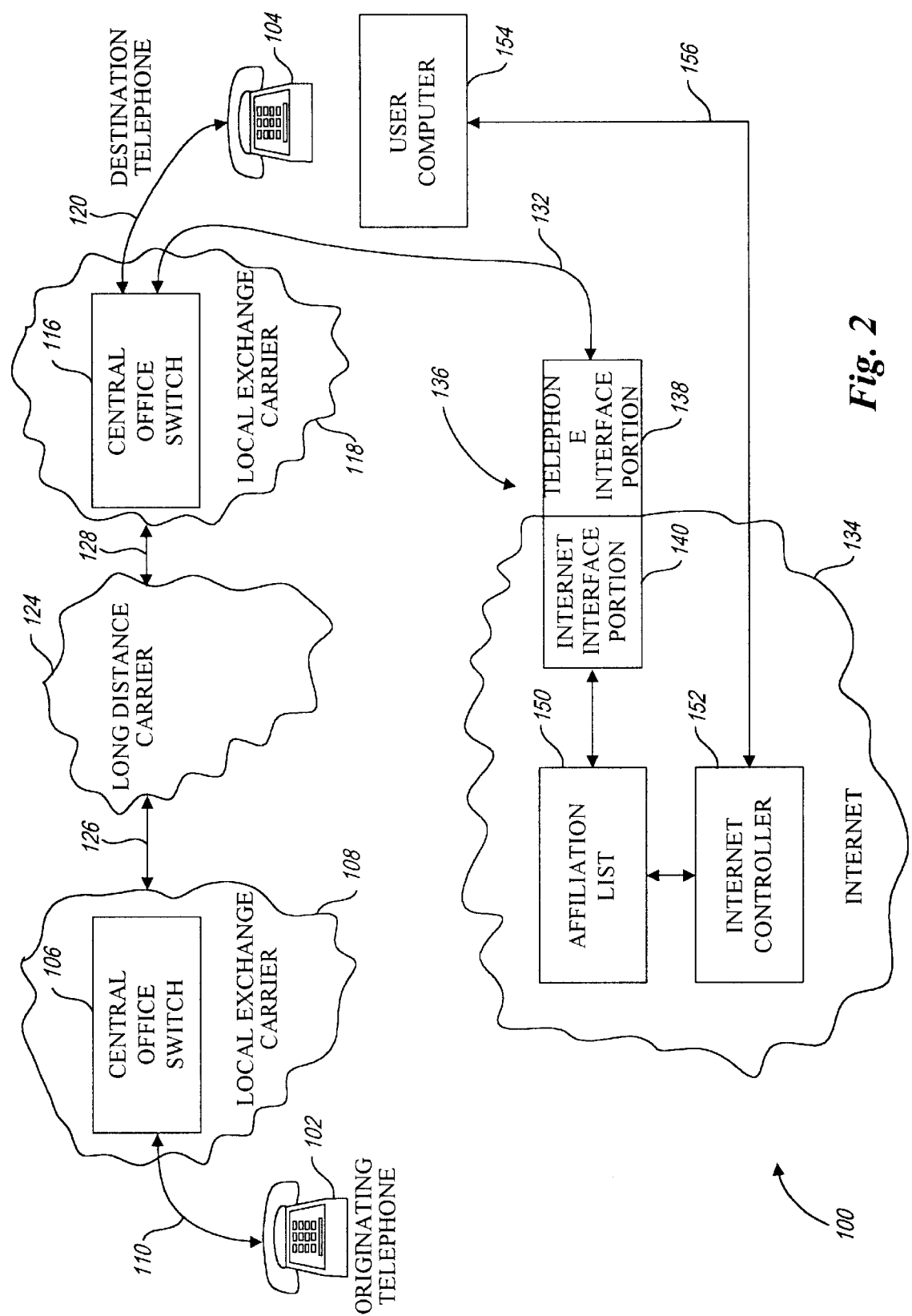
FIG. 2 is a functional block diagram outlining the operation of the present invention.

The present invention is embodied in a system 100 illustrated in the functional diagram of FIG. 2. In a typical telephone communication, an originating telephone 102 is operated by a calling party to place a call to a destination telephone 104. The originating telephone generates signals that are detected by a central office switch 106 operated by a local exchange carrier (LEC) 108. The LEC 108 is the telephone service provider for the calling party. The originating telephone 102 is coupled to the central office switch 106 via a communication link 110. As those skilled in the art can appreciate, the communication link 110 may be a hard-wired connection, such as a fiber optic, copper wire, or the like. Alternatively, the communication link 110 may be a wireless communication link if the originating phone 102 is a cellular telephone or some other form of wireless telephone.

Similarly, the destination telephone 104 is coupled to a central office switch 116 operated by a local exchange carrier (LEC) 118. The destination telephone 104 is coupled to the central office switch 116 via a communication link 120. The communication link 120 may be a hard-wired communication link or a wireless communication link, as described above with respect to the communication link 110. The present invention is not limited by the specific form of communication link or central office switch.

The LEC 108 establishes a communication link with the LEC 118. As illustrated in FIG. 2, the communication link between the LEC 108 and the LEC 118 is through a long distance carrier (LDC) 124. The LEC 108 establishes a communication link 126 with the LDC 124 which, in turn, establishes a communication link 128 with the LEC 118. If the telephone call from the originating telephone 102 to the destination telephone 104 is not a long distance call, the LDC 124 is not required. In this case, the communication link 126 may couple the LEC 108 directly to the LEC 118. The use of the system 100 with other telephone configurations are illustrated in other figures.

To place a telephone call, the calling party activates the originating telephone 102 to dial in the telephone number corresponding to the destination telephone number 104, thereby establishing the communication link 110 with the central office switch 106. In true, the central office switch 106 establishes the communication link 126 (via the LDC 124, if necessary), thus establishing a communication link with the central office switch 116. In a conventional telephone system, the central office switch 116 establishes the communication link 120 to the destination telephone 104 causing the destination telephone to ring. If the subscriber picks up the destination telephone, a complete communication link between the originating telephone 102 and the destination telephone 104 has been established. This is sometimes referred to as "terminating" the telephone call. The specific telecommunications protocol used to establish a telephone communication link between the originating telephone 102 and the destination telephone 104 is well known in the art and need not be described herein. The preceding description of techniques used to establish the telephone communication link are provided only as a basis for describing the additional activities performed by the system 100.

With the system 100, the central office switch 116 does not initially establish the telephone communication link 120 with the destination telephone 104 to cause the telephone to ring. Instead, the central office switch 116 establishes a communication link 132 with a computer network 134, such as the Internet. As those skilled in the art can appreciate, the Internet is a vast multi-computer network coupled together by data links having various communication speeds. Although the Internet 134 may use a variety of different communication protocols, a well-known communication protocol used by the Internet is a Transmission Control Protocol/Internet Protocol (TCP/IP). The transmission of data on the Internet 134 using the TCP/IP is known to those skilled in the art and need not be described in greater detail herein.

The central office switch 116 utilizes conventional telephone communication protocols, which may be different from the TCP/IP communication protocols used by the Internet 134. The system 100 includes a communication interface 136 to translate data between the two communication protocols. The communication interface 136 includes a telephone interface portion 138 and an Internet interface portion 140. The telephone interface portion 138 is coupled to the central office switch 116 via the communication link 132 such that communications occurring on the communication link 132 utilize the telephone communication protocol. The Internet interface portion 140 communicates via the Internet using conventional communication protocols, such as TCP/IP.

The communication interface 136 may be implemented on a computing platform that functions as a server. The conventional components of the computing platform, such as a CPU, memory, and the like are known to those skilled in the art and need not be described in greater detail herein. The telephone interface portion 138 may comprise an Integrated Services Digital Network (ISDN) Primary Rate Interface (PRI) to communicate with the central office switch 116. The ISDN PRI, which may be implemented on a plug-in computer card, provides information to the telephone interface portion 138, such as automatic number identification (ANI), dialed number identification service (DNIS), and the like. As is known, ANI provides the telephone number of the caller's telephone (e.g., the originating telephone 102) while the DNIS allows the number the caller dialed (e.g., the destination telephone 104) to be forwarded to a computer system. These data may be considered "keys" which may be used by the system 100 to identify the caller and the callee. Thus, the central office switch 116 provides information which may be used to access the affiliation list 150 for the destination telephone 104.

The Internet interface portion 140 may be conveniently implemented with a computer network card mounted in the same computing platform that includes the ISDN PRI card. However, it is not necessary for satisfactory operation of the system 100 that the interface cards be co-located in the same computing platform. It is only required that the telephone interface portion 138 communicate with the Internet interface portion 140. The Internet interface portion 140 receives the incoming data (e.g., the ANI, DNIS, and the like) and generates Internet compatible commands. The specific form of the Internet commands using, by way of example, TCP/IP, are within the scope of knowledge of one skilled in the art and need not be described herein. As will be described below, data provided by the central office switch 116 will be used to access data on the Internet and use that data to determine the manner in which a telephone call will be processed.

The Internet 134 stores an affiliation list 150, which may be established by the user of the destination telephone 104. Data stored within the affiliation list 150 is accessed by the central office switch 116 to determine the manner in which the call from the originating telephone 102 will be processed. Details of the affiliation list 150 are provided below. The Internet 134 also includes an Internet controller 152 which communicates with a user computer 154 via a network link 156. The communication between the user computer 154 and the Internet 134 is a conventional communication link used by millions of computers throughout the world. For example, the user computer 154 may be a personal computer (PC) containing a communication interface, such as a modem (not shown). The network link 156 may be a simple telephone communication link using the modem to communicate with the Internet 134. The Internet controller 152 functions in a conventional manner to communicate with the user computer 154 via the network link 156. Although the communication link 132 and the network link 156 are both communication links to the Internet, the network link 156 is a conventional computer connection established over a telephone line, a network connection, such as an Ethernet link, or the like. This conventional network link 156 is significantly different from the communication link 132 between the central office switch 116 and the Internet 134. The central office switch 116 establishes the communication link 132 to access data on the Internet and uses that accessed data to determine how to process an incoming call for the destination telephone 104. The network link 156 is a computer-to-computer connection that may simply use a telephone as the physical layer to establish the network link.

In the system 100, the central office switch 116 receives an incoming call from the originating telephone 102 via the central office switch 106 and, optionally, the LDC 124. Rather than immediately establishing the communication link 120 and generating a ring signal at the destination telephone 104, the central office switch 116 establishes the communication link 132 and communicates with the Internet 134 via the communication interface 136. The purpose of such communication is to access the affiliation list 150 and thereby determine the manner in which the user of the destination telephone 104 wishes calls to be processed.

Figure 3:
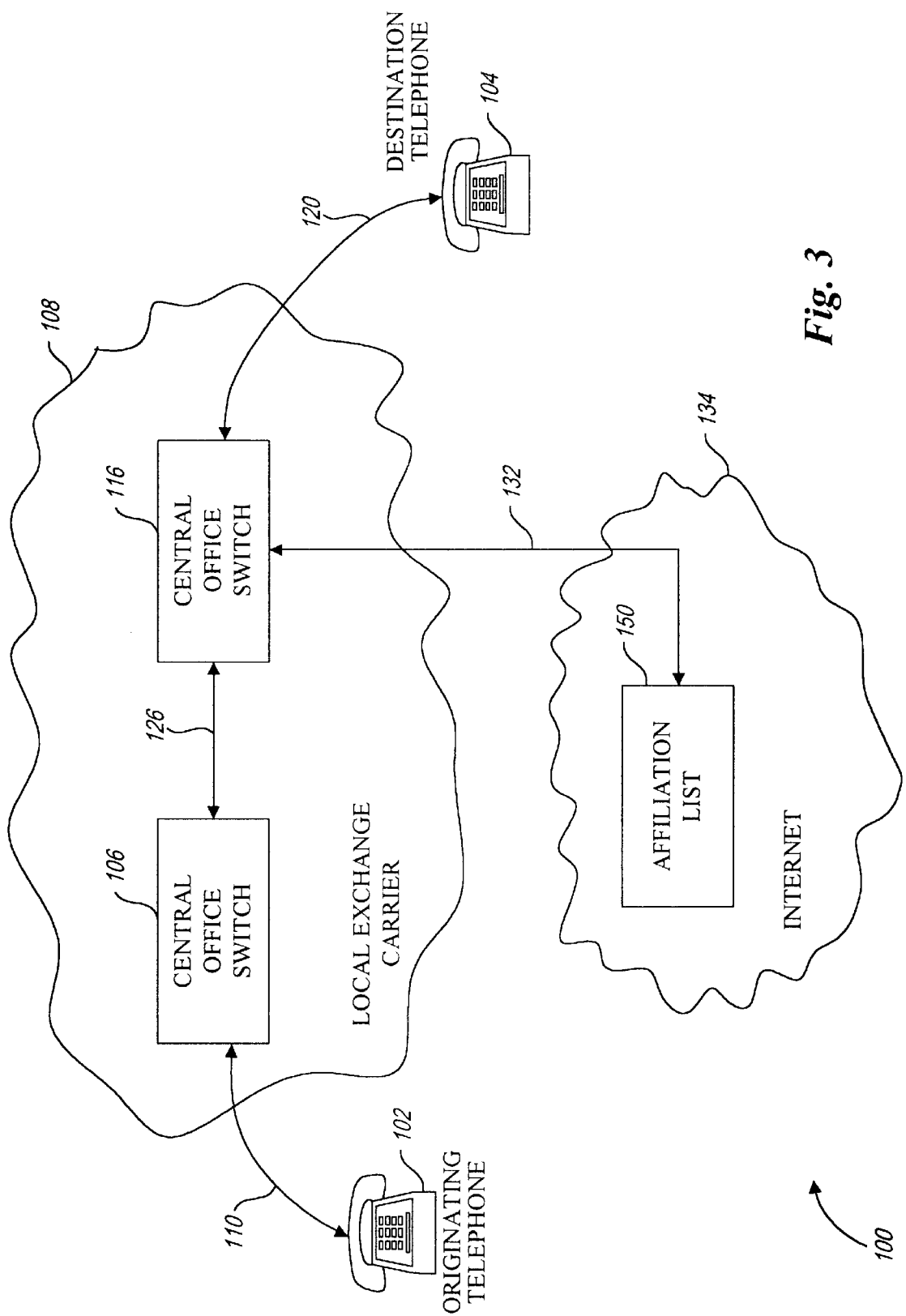
FIG. 3 is a functional block diagram of an alternate telecommunications configuration implementing the present invention.

FIG. 3 illustrates the system 100 for a telephone system configuration in which the originating telephone 102 and the destination telephone 104 are both serviced by the same local exchange carrier 108. The originating telephone 102 establishes the communication link 110 with the central office switch 106 in the manner described above. The central office switch 106 establishes the communication link 126 directly with the central office switch 116 without the need for the LDC 124 (see FIG. 2). The central office switch 116 operates in the manner described above. That is, the central office switch 116 does not immediately establish the communication link 120, but does establish the communication link 132 with the Internet 134. For the sake of simplicity, FIG. 3 does not illustrate the communication interface 136. However, those skilled in the art will appreciate that the central office switch 116 accesses the affiliation list 150 via the communication interface 136 (see FIG. 2).

For the sake of simplicity, FIG. 3 also does not show the Internet controller 152 and the user computer 154. However, those skilled in the art can appreciate that those portions of the system may also be present in the embodiment illustrated in FIG. 3. However, it should be noted that the user computer 154 and the Internet controller 152 need only be used to edit the affiliation list 150. The call processing by the central office switch 116 does not depend on the presence of the Internet controller 152 or the user computer 154. That is, the central office switch 116 accesses the affiliation list 150 via the communication interface 136 regardless of the presence of the user computer 154.

Figure 4:
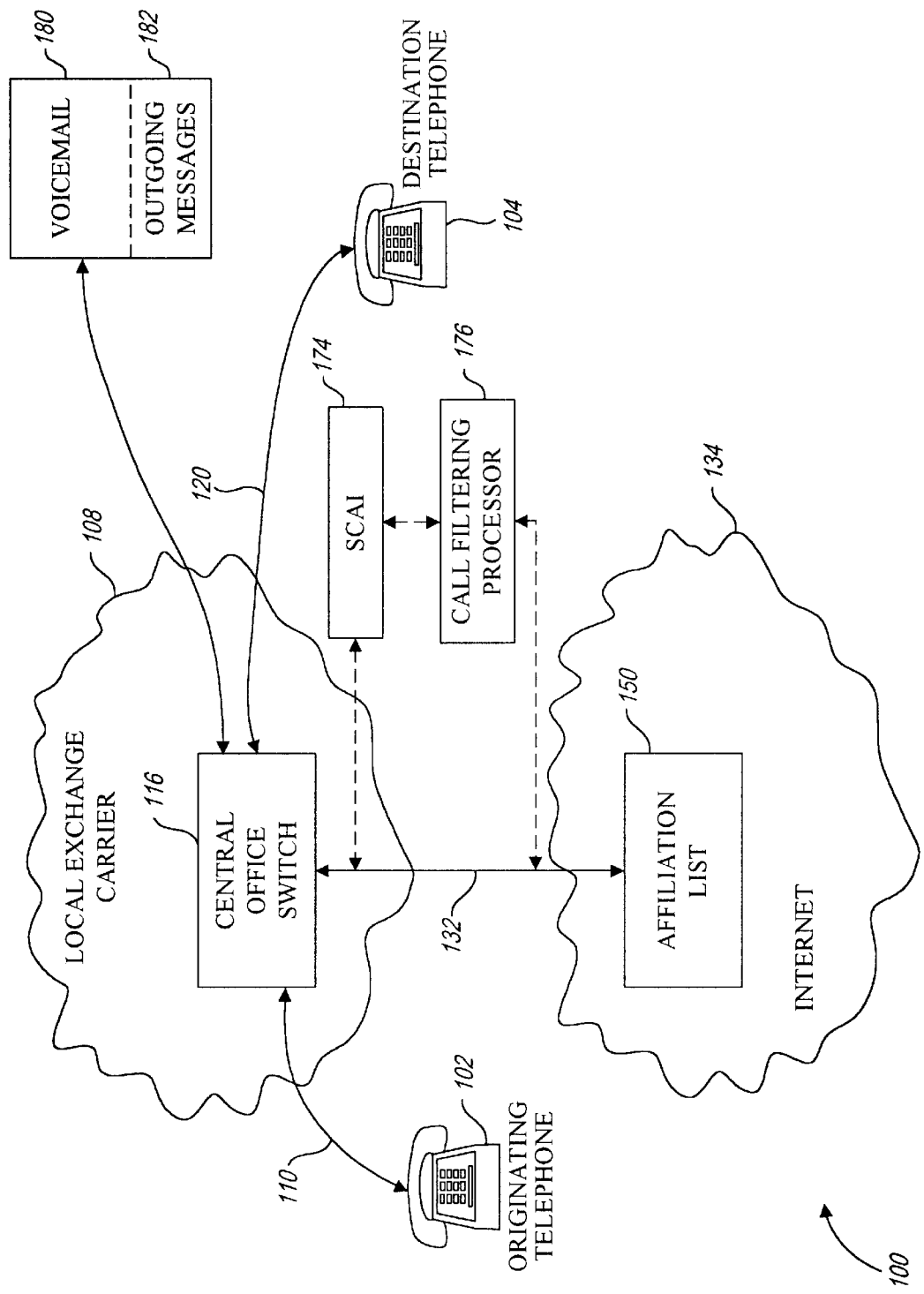
FIG. 4 is a functional block diagram of another alternative telecommunications configuration implementing the present invention.

In yet another telephone system configuration, illustrated in FIG. 4, the originating telephone 102 and the destination telephone 104 are not only serviced by the same local exchange carrier 108, but are connected to the same central office switch 116. However, the fundamental operation of the system 100 remains identical to that described above with respect to accessing the affiliation list 150. That is, the originating telephone 102 establishes the communication link 110 with the central office switch 116. However, the central office switch 106 need not establish the communication link 126 with any other central office switch since the destination telephone 104 is also connected to that same central office switch.

In this telephone system configuration, the central office switch 116 accesses the affiliation list 150 on the Internet 134 via the communication link 132 (see FIG. 2) in the manner described above. For the sake of simplicity, FIG. 4 does not illustrate the communication interface 136. However, those skilled in the art will recognize that the communication interface 136 operates to convert communication signals between telephone protocol used by the central office switch 106 and the Internet communication protocol used by the Internet 134. In addition, FIG. 4 also does not illustrate the Internet controller 152 and the user computer 154. As noted above with respect to FIG. 3, the Internet controller 152 and user computer 154 are not necessary for proper operation of the system 100. The user computer 154 is typically used in the system 100 to edit the affiliation list 150.

Figure 5:
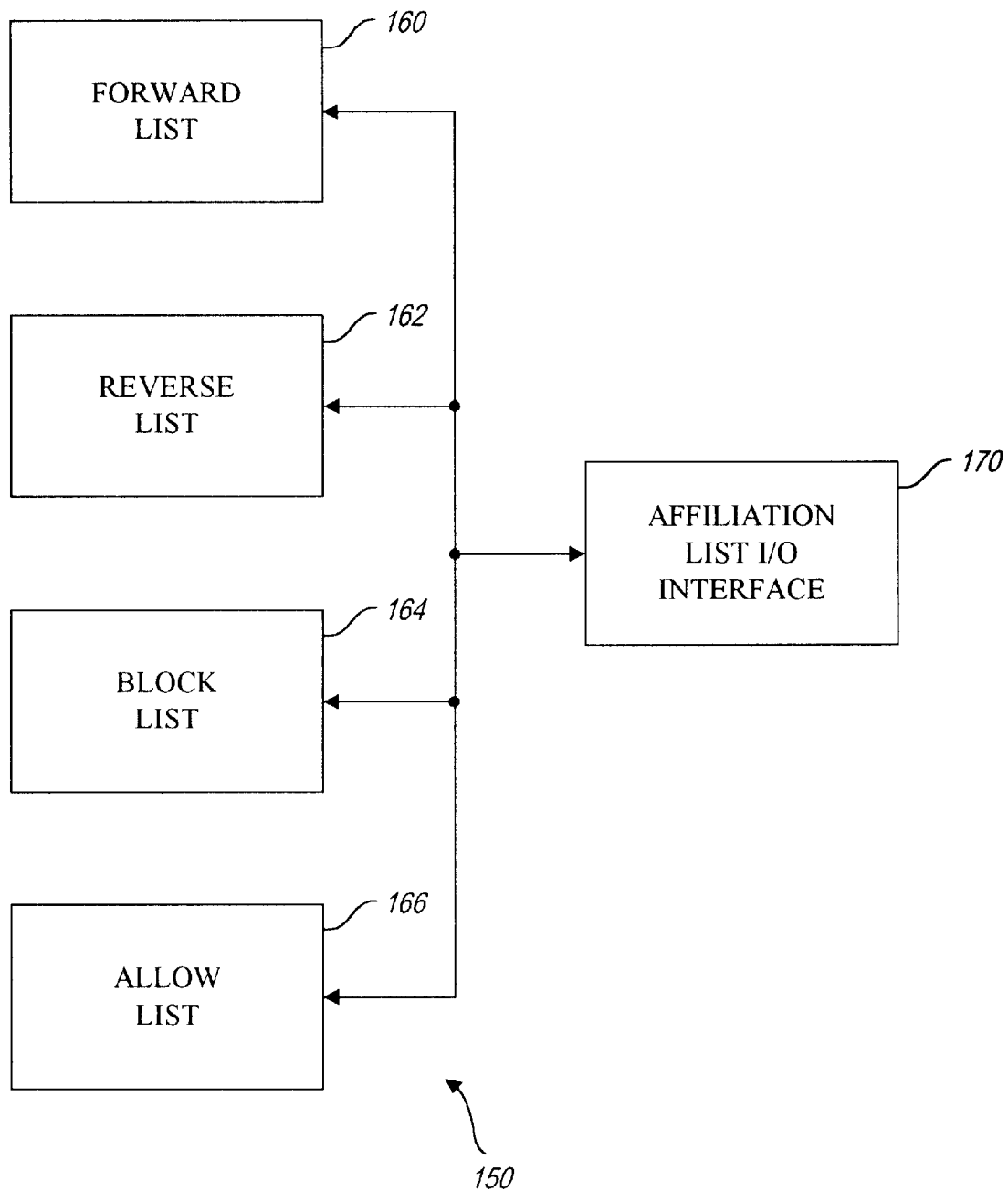
FIG. 5 is a functional block diagram providing details of the affiliation list of the system of FIG. 2.

The affiliation list 150 is illustrated in greater detail in the functional block diagram of FIG. 5. The affiliation list comprises a series of sublists, illustrated in FIG. 3 as a forward list 160, a reverse list 162, a block list 164, and an allow list 166. The forward list 160 contains a list of Internet subscribers whose Internet activity a user wishes to monitor. This list is sometimes referred to as a "buddy" list. When the user operates the user computer 154 on the Internet 134, the Internet controller 152 accesses the forward list 160 via an affiliation list input/output (I/O) interface 170 to determine which Internet subscribers contained within the forward list are currently active on the Internet 134. In conventional Internet operation, the Internet controller 152 sends a message to the user computer 154 indicating which Internet subscribers on the forward list 160 are currently active on the Internet 134.

The forward list 160 is a list of Internet subscribers whose activity is reported to the user. Other Internet subscribers may have their own forward list (not shown) and may monitor the Internet activity of the user. When the user accesses the Internet 134 with the user computer 154, that activity can be monitored by others. With the system 100, it is possible to determine who is monitoring the user's Internet activity. The reverse list 162 contains a list of Internet subscribers who have placed the user in their forward list. That is, the reverse list 162 contains a list of Internet subscribers who have placed the user in their buddy list. With the reverse list 162, the user can determine who is monitoring his Internet activity.

The block list 164 contains a list of Internet subscribers that the user does not want to monitor his Internet activity. That is, the user's Internet activity will not be provided to any Internet subscriber contained in the block list 164. Thus, even if a particular Internet subscriber has placed the user on their forward list, the presence of that particular Internet subscriber's name on the block list 164 will prevent the user's Internet activity from being reported to the particular Internet subscriber. The use of the block list 164 provides certain security assurances to the user that their Internet activity is not being monitored by any undesirable Internet subscribers.

The allow list 166 contains a list of Internet subscribers for whom the user may wish to communicate with but whose Internet activity the user does not wish to monitor.

The system 100 combines the capabilities of the affiliation list 150 with telephone switching technology to filter incoming calls to the destination telephone 104. For example, the user may specify that only calls from Internet subscribers contained in the forward list 154 may contact the user via the destination telephone 104. Alternatively, the user may specify that a calling party whose name is contained in the forward list 160 or the allow list 166 may place a call to the destination telephone 104. As will be discussed in greater detail below, the system 100 allows the user to create general conditional processing, such as blocking calls or allowing calls. However, the user can also create specific conditional processing for individual callers or based on the user's current status or preferences.

The central office switch 116 accesses the affiliation list 150 via the communication link 132 and determines whether the calling party is in a list (e.g., the forward list 160) that the user wishes to communicate with. If the calling party is contained within an "approved" list, the central office switch 116 establishes the communication link 120 and sends a ring signal to the destination telephone 104. Thus, the user can pick up the telephone with the knowledge that the calling party is an individual with whom the user wishes to communicate.

Conversely, if the calling party is not contained within an approved list, such as the forward list 160 or the allow list 166, the central office switch 116 will not establish the communication link 120 with the destination telephone 104. Thus, the user will not be bothered by undesirable phone calls. In one embodiment, the central switch office simply will not establish the communication link 120 and the calling party will recognize that the call did not go through. Alternatively, the central office switch 116 may generate a signal indicating that the destination telephone 104 is busy. In this alternative embodiment, the calling party will receive a busy signal on the originating telephone 102. Thus, the user has the ability to filter incoming calls by creating a list of those individuals with whom the user wishes to communicate.

It should be noted that the affiliation list 150 may be dynamically altered by the user to add or delete individuals, change individuals from one list to another, or to change the call processing options for a particular list depending on the user's preferences. For example, the user may want to accept all calls from any source at certain times of the day. Under these circumstances, the user can edit the allow list 166 to accept calls from any calling party. Alternatively, the user may still maintain the block list 164 such that calls will not be processed from certain specified parties even if the user is willing to accept calls from any other source. Under other circumstances, the user may not wish to communicate with any individuals. In this instance, the user may indicate that all calling parties are on the block list 164. Thus, the central office switch 116 will access the Internet 134 in real-time and review data in the affiliation list 150 to thereby process incoming calls for the user in accordance with the rules present in the affiliation list.

The discussion above provides examples of the central office switch 116 processing calls from a calling party in accordance with their presence or absence of certain lists in the affiliation list 150. For example, a call from a party on the forward list 160 will be connected to the destination telephone 104 (see FIG. 2) while a call from a party on the block list 164 will not be put through to the destination telephone. However, the system 100 also allows the selection of call processing options on an individual basis rather than simply on the presence or absence in a particular list. For example, the user can edit the allow list 166 to specify that certain individuals are "allowed" while other individuals may be allowed, conditionally allowed, or blocked all together. If the individual calling party has an associated status indicating that they are allowed, the central office switch 116 will process the incoming call and connect it to the destination telephone 104. If the individual calling party has an associated blocked status, the central office switch 116 will not process the call and will not connect it to the destination telephone 104.

Furthermore, the user may attach conditional status to individual callers or to calling lists. Conditional status may be based on factors, such as the time of day, current availability of the user, work status, or the like. For example, the user may accept calls from certain work parties during specified periods of the day (e.g., 9:00 a.m.–11:00 a.m.), block calls from selected calling parties during other periods of time (e.g., 12:00–1:00 p.m.), or allow calls during a business meeting only from certain calling parties (e.g., the boss). These conditional status criteria may be applied to individuals or to one or more lists in the affiliation list 150.

FIG. 6 illustrates sample data entries in the allow list 166. The allow list 166 may include data, such as a name, Internet subscriber name, and one or more phone numbers associated with the individual data entry. It should be noted that the calling party need not have an Internet subscriber name for proper operation of the system 100. That is, the central office switch 116 accesses the allow list 166 utilizing the calling party number and need not rely on any email addresses or other Internet subscriber identification for proper operation. The allow list 166 may also include an email alias in addition to or in place of the Internet subscriber name. Some Internet subscribers prefer to "chat" with other subscribers utilizing an alias rather than their actual Internet subscriber name. The data of FIG. 6 illustrates one possible embodiment for the allow list 166. However, those skilled in the art can appreciate that the allow list 166 may typically be a part of a large database (not shown). Database operation is well known in the art, and need not be described in greater detail herein. The database or other form of the forward list 160 may be satisfactorily implemented using any known data structure for storage of data. For example, the various lists (e.g., the allow list 166, the reverse list 162, the block list 164 and the allow list 166) may all be integrated within a single database structure. The present invention is not limited by the specific structure of the affiliation list 150 nor by the form or format of data contained therein.

Rather than incoming call filtering on the basis of presence in a particular list, such as the allow list 166, as illustrated in FIG. 6, the affiliation list 150 may contain status data on an individual basis. In this event, the central office switch 116 (see FIG. 2) processes the incoming call in accordance with the designated status for that individual. In the example illustrated in FIG. 7, the affiliation list 150 contains one individual with an "allowed" status, one individual with a "blocked" status, and one individual with a "conditional" status based on user-selected criteria. In the example of FIG. 7, the user-selected criteria may be based on the particular phone from which the call is originating as well as the time of day in which the call is originated. For example, the user may wish to allow all calls from a particular number, such as an caller's work number. However, calls from another number, such as the caller's home phone, may be blocked. Other calls, such as from a caller's cellular telephone, may be allowed only at certain times of day. FIG. 7 is intended to illustrate some of the call processing options that are available to the user. As can be appreciated, a variety of different conditional status criteria may be applied to one or more potential calling parties. However, a common feature of the system 100 is that the telecommunication system (e.g., the central office switch 116) determines calling party status on the basis of information stored on the Internet and processes the incoming call in accordance with the user-specified criteria. Moreover, the system 100 operates in real-time to process the incoming call in accordance with the user-specified criteria.

The Internet 134 may be conveniently used as a storage area for the caller specified criteria. The advantage of such data storage on the Internet is that the data is widely accessible to the user. This provides a convenient mechanism for entering new caller data or editing existing caller data. The user can access the affiliation list 150 with the user computer 154 via the network link 156. In contrast, the central office switch 116 may access the affiliation list 150 via the communication link 132, which may typically be a high-speed communication link. In addition, FIGS. 2, 4, and 5 illustrate the central office switch 116 as the telecommunication component that accesses the Internet 134. It is convenient for operational efficiency to have the central office switch (e.g., the central office switch 116) to which the destination telephone 104 is connected perform such Internet access. It is at this stage of the telephone call processing that the telecommunication system may most conveniently determine the user-specified caller status. However, those skilled in the art will recognize that the status check may be performed by other portions of the telecommunication system, such as the central office switch 106, the LDC 124, or the like. Thus, the present invention is not limited by the particular telecommunication component that establishes the communication link with a network which the user-specified caller status data is stored.

In addition, the system 100 can be readily implemented as an "add-on" component of the telecommunication system and need not be integrated with the central office switch 116. For example, the conventional central office switch provides the ability to divert calls based on certain call conditions, such as "Call Forward No Answer," which may be used to divert an incoming call to voicemail or "Call Forward Busy," which may also divert the incoming call to voicemail. To implement the system 100 with an add-on processor, the system may optionally include a Switch to Computer Applications Interface (SCAI) 174 and a call filtering processor 176. The dashed lines of FIG. 4 are intended to illustrate an alternative configuration of the system 100. This alternative configuration can also be implemented with other telephone system configurations, such as illustrated in FIGS. 2 and 3. The SCAI 174 is a telecommunication protocol that allows switches to communicate with external computers. Data, such as caller and callee telephone numbers, and status information, such as Call Forward Busy, are provided to the SCAI 174 by the central office switch 116.

The call filtering processor 176 performs the functions described above to process the call in accordance with the user-specified criteria. That is, the call filtering processor 176 receives caller and callee data from the SCAI 174 and accesses the affiliation list 150 via the communication interface 136 (see FIG. 2). The call filtering processor 176 uses user-specified call processing criteria to generate instructions for the central office switch 116. The instructions are provided to the central office switch 116 via the SCAI 174. Those skilled in the art will appreciate that the SCAI 174 is but one example of the Open Application Interface (OAI) that can be used with the central office switch 116.

As noted above, the system 100 can process a call intended for the destination telephone 104, block a call, or generate a busy signal at the originating telephone 102. However, the system 100 also operates with voicemail and permits a number of different customized outgoing messages. FIG. 4 illustrates a voicemail system 180 having a storage area containing one or more outgoing messages 182. For example, the voicemail system 180 can play an outgoing message 182 informing the caller that "the party you are calling only accepts calls from designated callers. Please leave a message." If calls are blocked only at certain times, the outgoing message 182 can say "the party you are calling does not accept calls between 11:30 a.m. and 1:00 p.m. Please leave a message or call back after 1:00 p.m." The outgoing message can also reflect callee availability by playing a message such as "The party you are calling is in a meeting. Please leave a message or call back in X minutes" where X reflects the amount of time before the meeting is expected to end. That information can be manually provided to the affiliation list 150 by the user or automatically derived from a computerized scheduling program on, by way of example, the user computer 154 (see FIG. 2).

Computerized scheduling programs, such as Microsoft® Schedule Plus, can be used on the user computer 154 (see FIG. 2). It is known that such scheduling programs can be accessed via a computer network or downloaded to a handheld computing device to track appointments. The system 100 can access such computerized scheduling programs and download appointments and scheduled meetings into the affiliation list 150. The outgoing messages 182 can be automatically selected on the basis of the user's computerized schedule. Thus, the system 100 permits the user to schedule his day (e.g., meetings, lunch time, in office/ available for calls, in office/unavailable for calls, etc.) on a computerized scheduling program and to process calls in accordance with the computerized schedule and even select outgoing messages automatically based on the user's schedule.

The operation of the system 100 is illustrated in the flowchart of FIG. 7. At a start 200, the calling party has placed a call from the originating telephone 102 (see FIG. 2) to the destination telephone 104. In step 202, the central office switch 116 has received call data from the originating telephone 102. The received call data includes the destination telephone number of the destination telephone 104 and identification data indicating the originating telephone 102 as the source of the present call. Use of automatic number identification (ANI) is a well-known technique for providing identification data indicating the originating telephone 102 as the source of the present call. While the specific implementation of ANI data, sometimes referred to as caller ID, may not be uniformly implemented throughout the United States, the ANI data is typically delivered between the first and second rings. In the present invention, the central office switch 116 (see FIG. 2) does not initiate a ring signal to the destination telephone 104 until after determining the status of the calling party based on the ANI. In future implementations, telecommunication companies may transmit other forms of caller identification, such as caller name, Internet address, email alias, or the like. The system 100 operates satisfactorily with any form of caller identification. The only requirement for the system 100 is that some form of caller identification be provided. The call is processed in accordance with the user-specified criteria in the affiliation list 150 for the identified caller.

In step 204, the central office switch 116 (see FIG. 2) establishes the communication link 132 with the Internet 134. Although step 204 illustrates the system 100 as actively establishing the communication link 132 with the Internet 134, those skilled in the art will recognize that the system 100 can utilize a continuous high-speed data link between the central office switch and the Internet. Thus, it is not necessary to establish a network link for each and every incoming call processed by the central office switch 116. As previously described, the communication interface 136 translates data between the telephone protocol and the Internet protocol. In step 206, the system 100 accesses the affiliation list 150 for the user (i.e., the called party). In an exemplary embodiment, the telephone number of the destination telephone 104 or other callee identification is used as an index or pointer to a specific location within the database where the affiliation list 150 for the particular user may be found. Database operation in general, and techniques for locating specific items within a database in particular are known to those skilled in the art and need not be described herein.

In decision 210, the system 100 determines whether the caller identification data is on the forward list 160 (see FIG. 3). If the caller identification data is present in the forward list, the result of the decision 210 is YES. In that event, the system 100 proceeds to FIG. 7B where the call is processed in accordance with the rules associated with the forward list 160.

If the caller identification data is not present in the forward list 160 (see FIG. 3), the result of decision 210 is NO. In that event, the system 100 moves to decision 212 to determine whether the caller identification data is in the allow list 166. If the caller identification data is present in the allow list 166, the result of decision 214 is YES. In that event, the system 100 proceeds to decision 216 where the call is processed in accordance with the rules associated with the allow list 166. If the caller identification data is not present in the allow list 166, the result of decision 216 is NO.

Figure 8:
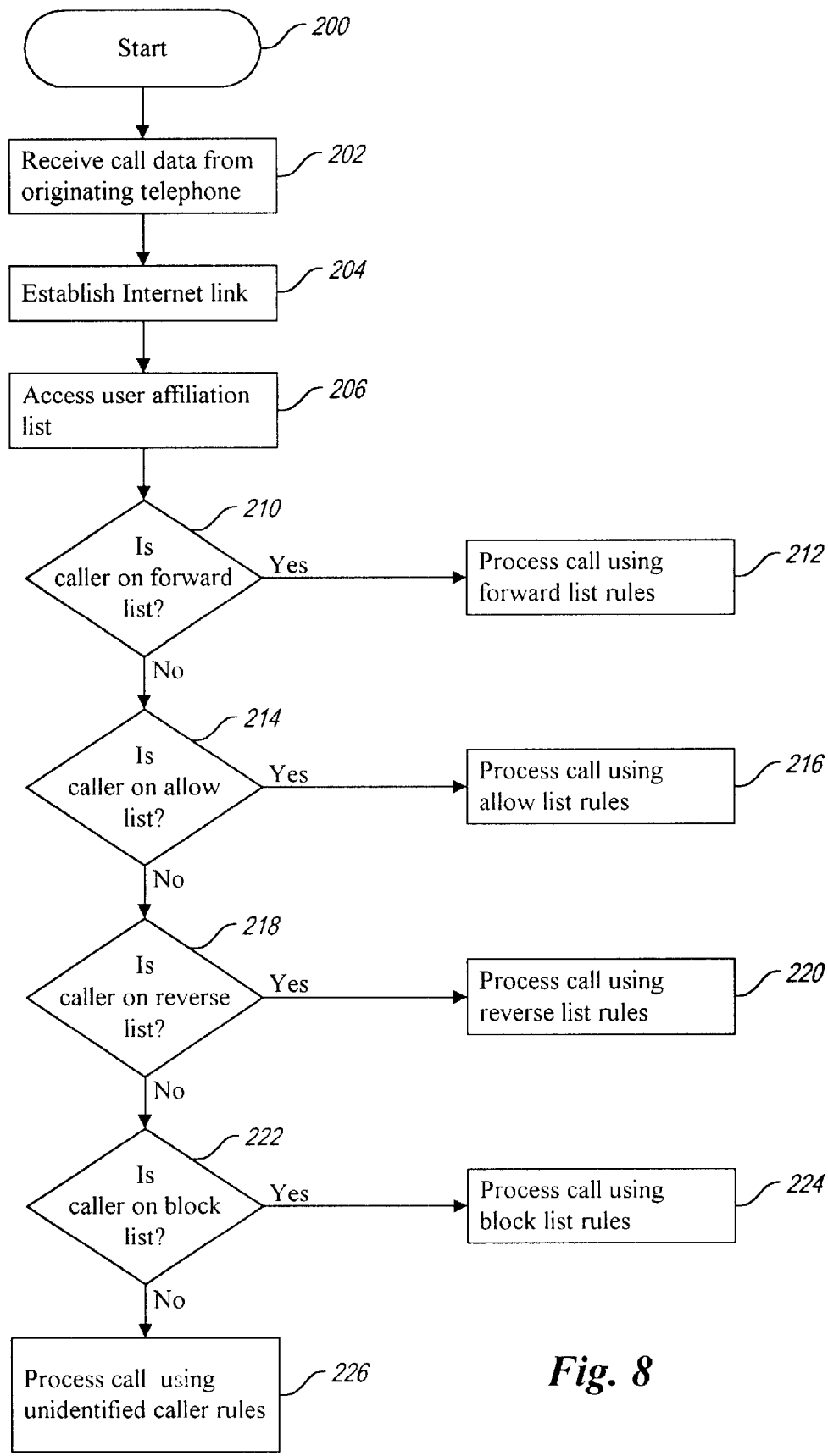
FIG. 8 is a flowchart illustrating the operation of the system of FIG. 2.

In decision 218, the system 100 determines whether the caller identification data is present in the reverse list 162. If the caller identification data is present in the reverse list 162, the system 100 proceeds to the step 220 where the call is processed in accordance with the rules associated with the reverse list 162. If the caller identification data is not present in the reverse list, the result of decision 218 is NO. In that event, the system moves to decision 216 to determine whether the caller is present on the block list 164. If the caller is present on the block list 164, the result of decision 222 is YES. In that event, the system proceeds to step 224 where the call is processed in accordance with the rules associated with the block list. If the caller identification data is not present in the block list 164, the result of decision 222 is NO. This indicates that the caller identification data is not present in any of the user-specified lists in the affiliation list 150. In that event, the system moves to step 226 where the call may be processed in accordance with user-specified rules of processing anonymous or unidentified calls. The flowchart of FIG. 8 illustrates the operation of the system 100 with multiple lists wherein the call processing rules are designated for each list. In this embodiment, the call is processed on the basis of the presence or absence of the caller identification data in a particular list. However, as previously discussed, the affiliation list 150 (see FIG. 6B) may include user-specified status criteria for individual callers. In this embodiment, the system 100 processes the call on the basis of the user-specified status criteria associated with the individual caller rather than on the basis of the caller's presence or absence in a specific list. In that event, the system 100 may simply access the user affiliation list (see step 206 in FIG. 7) and process the call in accordance with the user-specified status criteria for the individual caller. If the caller identification data is not present in the affiliation list 160, the call may be processed using user-specified call processing criteria for unidentified callers, as shown in step 226.

Thus, the system 100 allows the user to specify call processing rules for a plurality of different caller lists or for individual callers within a list. The caller lists may be readily edited in accordance with the changing desires of the user. The user may alter the call processing rules in accordance with various times of day, work conditions, or even the personal mood of the user. For example, the user may process all calls during certain times of the day, such as when the user is at work. However, when the user arrives home, subsequent calls may be processed in accordance with a different set of rules, such as accepting no calls during dinner time or after a certain time at night.

These rules may be applied differentially to different ones of the list in the affiliation list 150. For example, the user may accept calls from any calling party on the forward list 160 (see FIG. 3) or the allow list 166 during the evening hours. However, after a certain time at night, the caller may accept calls only from calling parties on the forward list 160. Thus, the system 100 allows great flexibility in the user selection of calling rules and lists. The system 100 allows the user to filter incoming calls in accordance with generalized rules or in accordance with highly specific rules.

From the foregoing it will be appreciated that, although specific embodiments of the invention have been described herein for purposes of illustration, various modifications may be made without deviating from the spirit and scope of the invention. For example, the system discussed herein uses, by way of example, the Internet 134 to store the affiliation list 150. However, the system 100 can be implemented with other computer networks or as a portion of a telephone switch, such as the central office switch 116. The telephone service provider can provide a customer with an affiliation list and some means to control the list as a value-added telephone service. The central office switch 116 accesses the internal affiliation list and processes the incoming calls in accordance with the user-specified criteria contained therein. Accordingly, the invention is not limited except as by the appended claims.

What is claimed is:

1. In an environment where subscribers call a user over a telephone network, wherein a user telephone is coupled with the telephone network, a system for processing an incoming call from a subscriber to a user in the telephone network according to user specifications, the system comprising:
   a data structure contained within a computer network to store user-selectable criteria for call processing, wherein the data structure stores the user-selectable criteria in one or more lists that are used in filtering an incoming call and wherein some of the one or more lists are used to filter the incoming call according to current activity of subscribers on the computer network or according to current activity of the user on the computer network;
   a computer network access port used by the telephone network to access the data structure such that the telephone network has access to the one or more lists over the computer network access port; and
   a controller to receive the incoming call designated for the user telephone and to process the incoming call in accordance with the user-selectable criteria, the controller accessing the user-selectable criteria in the one or more lists of the data structure via the computer network access port and thereby applying the user-selectable criteria to the incoming call.

2. The system of claim 1 wherein the data structure stores the user-selectable criteria in association with caller identification data and the incoming call includes origination identification data associated therewith, the controller using the origination identification data to identify user-selectable criteria stored in the data structure in association with the caller identification data.

3. The system of claim 2 wherein the identification data is telephone automatic number identification data.

4. The system of claim 2 wherein the identification data is electronic mail identification data.

5. The system of claim 1 wherein the user-selectable criteria indicates permission to process the incoming call, the controller processing the incoming call in accordance with the permission to generate a ring signal at the user telephone.

6. The system of claim 1 wherein the user-selectable criteria indicates no permission to process the incoming call, the controller blocking the incoming call and not generating a ring signal at the user telephone.

7. The system of claim 6 wherein the controller blocking the incoming call generates a busy signal at an origination telephone from which the incoming call is originated.

8. The system of claim 6, further comprising an outgoing message system having an outgoing message, the controller blocking the incoming call and playing the outgoing message at an origination telephone.

9. The system of claim 1 wherein the user-selectable criteria indicates permission to process the incoming call during a user-selected time period, the controller processing the incoming call during the user-selected time period in accordance with the permission to generate a ring signal at the user telephone, the controller blocking the incoming call and not generating a ring signal at the user telephone during a time period other than the user-selected time period.

10. The system of claim 9, further comprising an outgoing message system storing a plurality of outgoing messages, the controller selecting one of the plurality of outgoing messages wherein the outgoing message system plays the selected outgoing message at an origination telephone from which the incoming call is originated.

11. The system of claim 10 wherein the incoming call arrives at a particular time other than the user-selected time period, the controller selecting the selected outgoing message based on the particular time of arrival of the incoming call.

12. The system of claim 1, further comprising a data editor to permit user entry and editing of the user-selectable criteria into the data structure.

13. The system of claim 12 wherein the data editor is a computer coupled to the computer network.

14. The system of claim 1 wherein the computer network is the Internet.

15. The system of claim 1 wherein each of the one or more lists of the data structure comprises a plurality of data substructures each storing caller identification data and having the user-selectable criteria associated with each of the plurality of data substructures, wherein the incoming call includes origination identification data associated therewith, the controller using the origination identification data to determine a particular one of the plurality of data substructures storing caller identification data corresponding to the origination identification data and processing the incoming call in accordance with the user-selectable criteria associated with the particular one of the plurality of data substructures.

16. The system of claim 15, further comprising a data editor to permit user entry of the caller identification data into the data structure prior to receipt of the incoming call.

17. The system of claim 15 wherein a first of the plurality of data substructures is a list of caller identification data to identify individuals from whom the user will accept incoming calls, the controller processing the incoming call and signaling the user telephone of an incoming call directed to the user telephone if the origination identification data corresponds to caller identification data in the first of the plurality of data substructures.

18. The system of claim 15 wherein a first of the plurality of data substructures is a list of caller identification data to identify individuals from whom the user will not accept incoming calls, the controller blocking processing of the incoming call if the origination identification data corresponds to caller identification data in the first of the plurality of data substructures.

19. The system of claim 18 wherein the controller blocking processing of the incoming call generates a busy signal at an origination telephone from which the incoming call is originated.

20. The system of claim 15 wherein a first of the plurality of data substructures is a list of caller identification data to identify individuals from whom the user will accept incoming calls subject to user-selected time restrictions, the controller processing the incoming call in accordance with the time restrictions and signaling the user telephone of an incoming call directed to the user telephone if the origination identification data corresponds to caller identification in the first of the plurality of data substructures.

21. In an environment where subscribers call a user over a telephone network, wherein a user telephone is coupled with the telephone network, a system for user specification of call processing in the telephone network, the system comprising:

a data structure contained within a computer network and accessible by the telephone network, the data structure containing a plurality of caller lists each having associated user-selectable criteria for call processing, wherein some of the plurality of caller lists are conditioned according to current activity of subscribers on the computer network or according to current activity of the user on the computer network;

a computer network access port used by the telephone network to access the data structure such that the telephone network has access to the plurality of caller lists; and a controller on the telephone network to receive an incoming call having origination data indicative of a subscriber and destination data indicating the call is designated for the user telephone, the controller accessing the plurality of caller lists in the data structure via the computer network access port to determine which of the plurality of caller lists contains the origination data, the controller processing the incoming call in accordance with the user-selectable criteria associated with the caller list containing the origination data.

22. The system of claim 21 wherein the user-selectable criteria associated with the caller list containing the origination data indicates permission to process the incoming call, the controller processing the incoming call in accordance with the permission to generate a ring signal at the user telephone.

23. The system of claim 21 wherein the user-selectable criteria associated with the caller list containing the origination data indicates no permission to process the incoming call, the controller blocking the incoming call and not generating a ring signal at the user telephone.

24. The system of claim 21 wherein the user-selectable criteria associated with the caller list containing the origination data indicates permission to process the incoming call during a user-selected time period, the controller processing the incoming call during the user-selected time period in accordance with the permission to generate a ring signal at the user telephone, the controller blocking the incoming call and not generating a ring signal at the user telephone during time periods other than the user-selected time period.

25. The system of claim 21, further comprising a data editor to permit user entry and editing of the user-selectable criteria into the data structure.

26. The system of claim 21 wherein the computer network is the Internet.

27. The system of claim 21 wherein the telephone network is a public switched telephone network.

28. In a system where subscribers call a user over a telephone network, wherein a user telephone is coupled with the telephone network, a computer program product for implementing a method for processing a call from a subscriber to a user over a telephone network, the computer program product comprising:

a computer readable medium having computer executable instructions for performing the method, the method comprising:

accepting an incoming call designated for the user telephone;

accessing a data structure contained within a computer network that is independent of the telephone network to retrieve user-selectable criteria for call processing stored within the data structure, wherein some of the user-selectable criteria is conditioned on current activity of subscribers on the computer network or according to current activity of the user on the computer network; and processing the incoming call in accordance with the user-selectable criteria.

29. The computer program product of claim 28, further comprising:

generating call processing rules based on the user-selectable criteria; and storing the call processing rules on the computer network in association with a caller list.

30. The computer program product of claim 29 wherein generating call processing rules is performed on a computer coupled to the computer network.

31. The computer program product of claim 28 wherein the data structures store the user-selectable criteria in association with caller identification data and the incoming call includes origination identification data associated therewith, the method further comprising accessing the data structure using the origination identification data to identify user-selectable criteria stored in the data structure in association with the caller identification data.

32. The computer program product of claim 28 wherein the user-selectable criteria indicates permission to process the incoming call, the method comprising:

processing the incoming call comprising establishing a link with the user telephone; and generating a ring signal at the user telephone.

33. The computer program product of claim 28 wherein the user-selectable criteria indicates no permission to process the incoming call, the method further comprising processing the incoming call comprising blocking the incoming call; and not generating a ring signal at the user telephone.

34. The computer program product of claim 33, further comprising generating a busy signal at an origination telephone from which the incoming call is originated.

35. The computer program product of claim 34, further comprising playing an outgoing message at an origination telephone from which the incoming call is originated, the outgoing message indicating that the incoming call will not be connected to the user telephone.

36. The computer program product of claim 28 wherein the user-selectable criteria indicates permission to process the incoming call during a user-selected time period, the method further comprising:

processing the incoming call during the user-selected time period in accordance with the permission to generate a ring signal at the user telephone; and blocking the incoming call and not generating a ring signal at the user telephone during time periods other than the user-selected time period.

37. The computer program product of claim 28 wherein the data structure comprises a plurality of data substructures each storing caller identification data and having the user-selectable criteria associated with each of the plurality of data substructures, wherein the incoming call includes origination identification data associated therewith, the method further comprising:

accessing the data structure using the origination identification data to determine a particular one of the plurality of data substructures storing caller identification data corresponding to the origination identification data; and processing the incoming call in accordance with the user-selectable criteria associated with the particular one of the plurality of data substructures.

38. In a system including a telephone network and a computer network where an originating telephone connects with a user telephone over the telephone network, a method for processing a call from the originating telephone to the user telephone according to user specifications, the method comprising:

accepting an incoming call designated for the user telephone from an originating telephone of a subscriber;

accessing a data structure contained within a computer network that is independent of the telephone network to retrieve user-selectable criteria for call processing stored within the data structure, wherein some of the user-selectable criteria is conditioned on current activity of subscribers on the computer network or according to current activity of the user on the computer network; and processing the incoming call of the subscriber in accordance with the user-selectable criteria.

39. The method of claim 38, further comprising generating call processing rules based on the user-selectable criteria and storing the call processing rules on the computer network in association with a caller list that is associated with the data structure.

40. The method of claim 39 wherein generating call processing rules is performed on a computer coupled to the computer network.

41. The method of claim 38 wherein the computer network is the Internet.

42. The method of claim 38 wherein the telephone network is a public switched telephone network.

43. The method of claim 38 wherein the data structure stores the user-selectable criteria in association with caller identification data and the incoming call includes origination identification data associated therewith, wherein accessing a data structure further comprises using the origination identification data to identify user-selectable criteria stored in the data structure in association with the caller identification data.

44. The method of claim 38 wherein the user-selectable criteria indicates permission to process the incoming call, wherein processing the incoming call further comprises establishing a link with the user telephone and generating a ring signal at the user telephone.

45. The method of claim 38 wherein the user-selectable criteria indicates no permission to process the incoming call, wherein processing the incoming call further comprises blocking the incoming call and not generating a ring signal at the user telephone.

46. The method of claim 45, further comprising generating a busy signal at an origination telephone from which the incoming call is originated.

47. The method of claim 45, further comprising playing an outgoing message at an origination telephone from which the incoming call is originated, the outgoing message indicating that the incoming call will not be connected to the user telephone.

48. The method of claim 38 wherein the user-selectable criteria indicates permission to process the incoming call during a user-selected time period, wherein processing the incoming call further comprises:

processing the incoming call during the user-selected time period in accordance with the permission to generate a ring signal at the user telephone;

blocking the incoming call; and not generating a ring signal at the user telephone during time periods other than the user-selected time period.

49. The method of claim 38 wherein the data structure comprises a plurality of data substructures each storing caller identification and having the user-selectable criteria associated with each of the plurality of data substructures, wherein the incoming call includes origination identification data associated therewith, wherein accessing the data structure further comprises using the origination identification data to determine a particular one of the plurality of data substructures storing caller identification data corresponding to the origination identification data and processing the incoming call in accordance with the user-selectable criteria associated with the particular one of the plurality of data substructures.

50. The method of claim 49 wherein a first of the plurality of data substructures is a list of caller identification data to identify individuals from whom the user will accept incoming calls, wherein processing the incoming call further comprises signaling the user telephone of an incoming call directed to the user telephone if the origination identification data corresponds to caller identification in the first of the plurality of data substructures.

51. The method of claim 49 wherein a first of the plurality of data substructures is a list of caller identification data to identify individuals from whom the user will not accept incoming calls, wherein processing the incoming call further comprises not establishing a communication link with the user telephone if the origination identification data corresponds to caller identification in the first of the plurality of data substructures.

* * * * *

UNITED STATES PATENT AND TRADEMARK OFFICE
CERTIFICATE OF CORRECTION

PATENT NO. : 6,421,439 B1
DATED : July 16, 2002
INVENTOR(S) : Stephen Mitchell Liffick Page 1 of 1

It is certified that error appears in the above-identified patent and that said Letters Patent is hereby corrected as shown below:

Column 1,
Line 37, after "need for" please insert -- a --

Column 3,
Line 61, before "and the like" please delete "(ROM)," and insert -- (ROMs), --

Column 5,
Line 3, after "In" please delete "true" and insert -- turn --

Column 10,
Line 28, after "such as" please delete "an" and insert -- a --

Column 17,
Line 31, after "method further comprising" please insert -- : --

Signed and Sealed this

Sixth Day of April, 2004

JON W. DUDAS
*Acting Director of the United States Patent and Trademark Office*